United States Patent
Thompson

(10) Patent No.: US 10,887,255 B2
(45) Date of Patent: Jan. 5, 2021

(54) CPDLC CHAT SYSTEM AND METHOD

(71) Applicant: Rockwell Collins, Inc., Cedar Rapids, IA (US)

(72) Inventor: Bradley R. Thompson, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 16/372,736

(22) Filed: Apr. 2, 2019

(65) Prior Publication Data

US 2020/0322290 A1   Oct. 8, 2020

(51) Int. Cl.
*H04L 12/58* (2006.01)
*H04W 4/12* (2009.01)
*H04W 4/42* (2018.01)
*B64D 45/00* (2006.01)
*G08G 5/00* (2006.01)
*H04W 4/46* (2018.01)
*H04W 4/20* (2018.01)

(52) U.S. Cl.
CPC .............. *H04L 51/04* (2013.01); *B64D 45/00* (2013.01); *G08G 5/0004* (2013.01); *H04W 4/12* (2013.01); *H04W 4/42* (2018.02); *H04W 4/46* (2018.02); *H04W 4/20* (2013.01)

(58) Field of Classification Search
CPC ...... B64D 45/00; G08G 5/0004; H04L 51/04; H04W 4/12; H04W 4/20; H04W 4/42; H04W 4/46
See application file for complete search history.

(56) References Cited

U.S. PATENT DOCUMENTS

| | | | | |
|---|---|---|---|---|
| 2012/0271616 A1* | 10/2012 | Ludwig | ...................... | G06F 3/14 703/28 |
| 2013/0033387 A1* | 2/2013 | Trope | ...................... | G01C 23/00 340/971 |
| 2015/0212701 A1* | 7/2015 | Rodney | ............... | G06F 3/04842 715/771 |
| 2016/0035227 A1* | 2/2016 | Kumar | ................... | G01C 23/00 340/971 |
| 2016/0379499 A1* | 12/2016 | Balasubramanian | ....................... | G08G 5/0013 701/300 |
| 2017/0365177 A1* | 12/2017 | Puentes | .................. | B64D 43/00 |

* cited by examiner

*Primary Examiner* — Gil H. Lee
(74) *Attorney, Agent, or Firm* — Suiter Swantz pc llo

(57) ABSTRACT

A system and method for Controller Pilot Data Link Communication (CPDLC) chat is disclosed. The system receives CPDLC signals and displays CPDLC messages sent and received from both ownship aircraft and optionally other nearby aircraft on the ownship aircraft display. Not to interfere with a traditional CPDLC display, the system is an additional display of all CPDLC data and highlights messages to and from the ownship on the aircraft display. The system allows a declutter option to limit displayed data to that of a current data authority (CDA) as well as a limit in range, geography, altitude, aircraft type, etc.

16 Claims, 5 Drawing Sheets

CPDLC CHAT SYSTEM AND METHOD

BACKGROUND

Controller Pilot Data Link Communication (CPDLC) provides the ability for pilots and Air Traffic Control (ATC) to communicate digitally via text messages. One of the main benefits of this form of communication is limiting congestion on voice communication frequencies in busy airspace. However, one positive benefit voice communication may provide is the "party-line" concept, which allows pilots to monitor voice communications between ATC and other aircraft tuned to the same frequency. This valuable information broadcast via voice may allow pilots to increase situational awareness of nearby activity.

For example, by listening to other communications, pilots may approximate a position of a nearby aircraft, become aware of a current weather situation along their route of flight, obtain turbulence reports and overhear optimal altitudes for smoother rides, increase awareness of deviation directions around weather systems, and learn about delays due to ATC congestion, weather, or other reasons.

Unfortunately, current CPDLC communications are limited to a one-to-one form of communication between ATC and an aircraft. This limitation effectively eliminates the pilot's ability to increase awareness relating to nearby traffic and the benefits thereof.

Therefore, a need remains for a system and related method which may overcome these limitations and provide an ability for increasing mutual support between aircraft building pilot situational awareness via a display of communications between nearby aircraft and a controlling authority.

SUMMARY

In one aspect, embodiments of the inventive concepts disclosed herein are directed to a system for mutual display of Controller Pilot Data Link Communication (CPDLC) messages. The system may comprise a radio configured for sending and receiving radio frequency data signals, an antenna operatively coupled with the radio, the radio and the antenna functional on a first aircraft. To control the function, the system may include a controller operatively coupled with the radio, a CPDLC display, and a pilot display. The controller may function with a tangible, non-transitory memory configured to communicate with the controller, the tangible, non-transitory memory having instructions stored therein that, in response to execution by the controller, cause the controller to execute functions associated with the operation of the system.

The system may function to receive a first CPDLC inbound data message, the first CPDLC inbound data message addressed to the first aircraft. The system may display the first CPDLC inbound data message on each of: the CPDLC display and the pilot display. The system may receive a CPDLC outbound data message from a pilot interface aboard the first aircraft, the CPDLC outbound data message addressed to a data authority. The system may display the CPDLC outbound data message on each of: the CPDLC display and the pilot display, and send the CPDLC outbound data message to the radio. The system may receive a second CPDLC inbound data message sent from the data authority and display the second CPDLC inbound data message on the pilot display. The system may receive a third CPDLC inbound data message sent from a second aircraft and display the third CPDLC inbound data message on the pilot display.

A further embodiment of the inventive concepts disclosed herein may be directed to a method for CPDLC chat. The method may comprise, at a step 502, receiving a first CPDLC inbound data message, the first CPDLC inbound data message addressed to a first aircraft. This first inbound CPDLC message may be directive for the flight crew of the first aircraft to execute a maneuver. To ensure the flight crew receives the first inbound message, the method may display, at a step 504, the first CPDLC inbound data message on each of: a CPDLC display and a pilot display. To ensure all message traffic associated with the first aircraft is available to the flight crew, the method may include, at a step 506, receiving a CPDLC outbound data message from a pilot interface aboard the first aircraft, the CPDLC outbound data message addressed to a data authority and, at a step 508, displaying the CPDLC outbound data message on each of: the CPDLC display and the pilot display. The method may include, at a step 510, sending the CPDLC outbound data message to the radio.

Additionally, to offer situational awareness to the pilots of the first aircraft, the method may include, at a step 512, receiving a second CPDLC inbound data message sent from the data authority and, at a step 514, displaying the second CPDLC inbound data message on the pilot display. Also, the method may include, at a step 516, receiving a third CPDLC inbound data message sent from a second aircraft and, a step 518, displaying the third CPDLC inbound data message on the pilot display.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
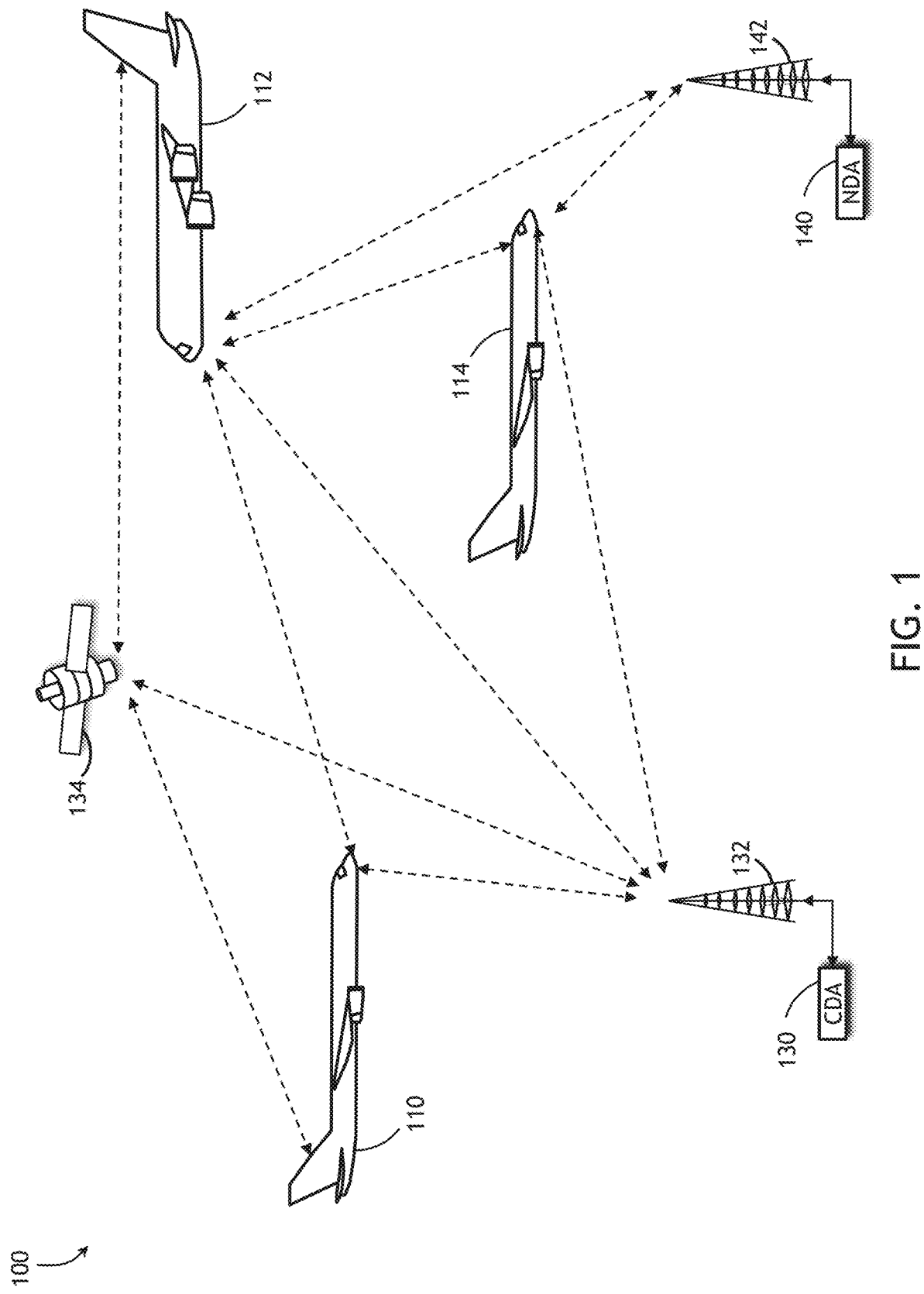
FIG. 1 is a diagram of an environment in which CPDLC chat may operate in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for Controller Pilot Data Link Communication (CPDLC) chat is disclosed. The system receives CPDLC signals and displays CPDLC messages sent and received from both ownship aircraft and optionally other nearby aircraft on the ownship aircraft display. Not to interfere with a traditional CPDLC display, the system is an additional display of all CPDLC data and highlights messages to and from the ownship on the aircraft display. The system allows a declutter option to limit displayed data to that of a current data authority (CDA) as well as a limit in range, geography, altitude, aircraft type, etc.

| Reference Chart | |
|---|---|
| 100 | Environment View |
| 110 | Ownship Aircraft |
| 112 | Opposite Aircraft |
| 114 | Parallel Aircraft |
| 130 | Current Data Authority |
| 132 | CDA Antenna |
| 134 | Communications Satellite |
| 140 | Next Data Authority |
| 142 | NDA Antenna |
| 200 | System View |
| 210 | CPDLC Display Pilot Interface |
| 220 | Multi-Function Display (MFD) |
| 222 | CPDLC Chat Log |
| 230 | Controller |
| 232 | Memory |
| 234 | Radio |
| 236 | Antenna |
| 240 | Ownship Data |
| 250 | Traditional CPDLC System |
| 300 | Flowchart for CPDLC Chat |
| 302 | Receive Inbound Message |
| 304 | Query Ownship Data?+0 |
| 306 | Highlight Ownship Data on MFD |
| 308 | Display CPDLC Data on CPDLC display |
| 310 | Display Data on MFD |
| 312 | Receive Outbound Message |
| 400 | Available Settings |
| 410 | CPDLC Log Page |
| 412 | CDA Select Page |
| 414 | Range Select Page |
| 500 | Method Flow |
| 502 | Receive First Inbound |
| 504 | Display First Inbound |
| 506 | Receive Outbound |
| 508 | Display Outbound |
| 510 | Send Outbound |
| 512 | Receive Second Inbound |
| 514 | Display Second Inbound |
| 516 | Receive Third Inbound |
| 518 | Display Third Inbound |

FIG. 1

Referring now to FIG. 1, a diagram of an environment in which CPDLC chat may operate in accordance with an embodiment of the inventive concepts disclosed herein is shown. Generally, embodiments of the inventive concepts disclosed herein may restore an ability for pilots in each aircraft to monitor other aircraft communications with Air Traffic Control (ATC) when using CPDLC.

An environment 100 within which embodiments of the inventive concepts disclosed herein may operate may include airspace controlled by a Current Data Authority (CDA) 130 with an associated CDA antenna 132. The CDA 130 may communicate with and control each aircraft within airspace bounded by its geographical area of responsibility (AOR). In order to enter the specific airspace of the CDA, each aircraft must establish data link communications with the CDA before entering the CDA AOR. Here, pilots of an ownship aircraft 110 have established communication with the CDA and are transiting the airspace of the CDA. In addition, a parallel aircraft 114 and an opposite aircraft 112 are nearby the ownship aircraft 110 where CPDLC communications between the CDA and these aircraft may be of interest to the ownship aircraft 110 pilots for increased pilot situational awareness.

Communications between the CDA and each aircraft 110-114 may be direct via a line of sight communications link or via satellite communications via a communications satellite 134. The data associated with the CPDLC signal is the same regardless of the method of transmission and reception.

Enroute to a destination, the ownship aircraft 110 may transit a plurality of AORs each with a data authority tasked with aircraft management and separation. Here, a Next Data Authority (NDA) 140 with associated NDA antenna 142 may be next in line for the ownship aircraft 110 to contact and remain under positive control. For example, Gander Area Control Center (ACC) with an identifier of CZQX may function as a CDA in the north Atlantic. As the ownship aircraft 110 may fly east across the Atlantic, the NDA may include Shanwick Oceanic control with an identifier of EGGX. Before entering the airspace controlled by Shanwick, the ownship aircraft must establish a CPDLC link with Shanwick.

FIG. 2

Figure 2:
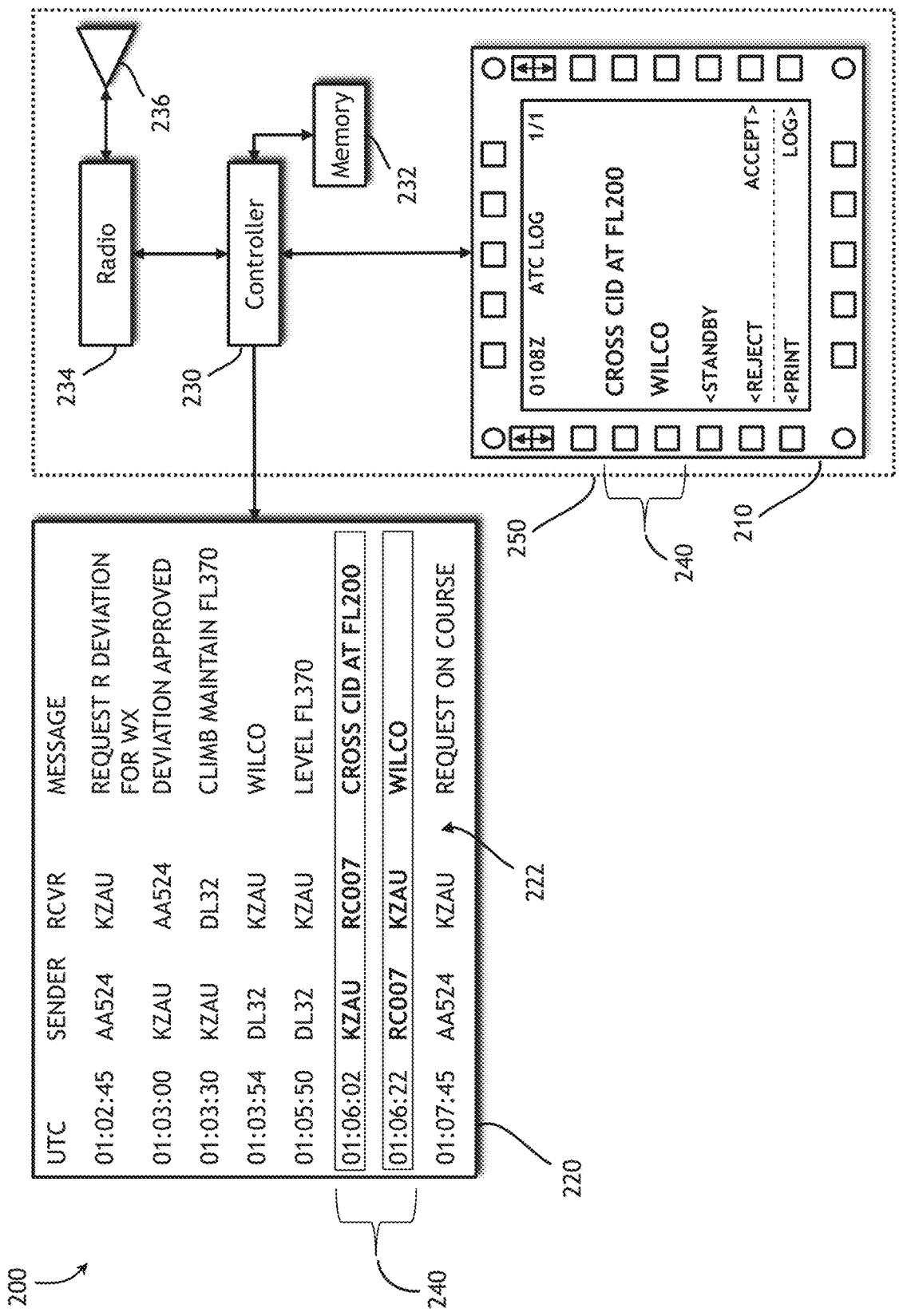
FIG. 2 is a diagram of a system for CPDLC chat in accordance with an embodiment of the inventive concepts disclosed herein.

Referring now to FIG. 2, a diagram of a system for CPDLC chat in accordance with an embodiment of the inventive concepts disclosed herein is shown. A system for CPDLC chat 200 may enable pilots of one aircraft to read communications between a CDA or NDA and all aircraft of interest. The system for CPDLC chat 200 may be comprised of a multi-function display (MFD) 220 sited on a flight deck display system which may be configured to display various CPDLC communications between a data authority such as a CDA 130 and ownship aircraft 110 as well as other aircraft 112, 114. The system for CPDLC chat 200 may also include a controller 230 coupled with a radio 234 and associated antenna 236.

In one embodiment of the inventive concepts disclosed herein, the system for CPDLC chat 200 may employ the MFD 220 to provide the flight crew with a real time CPDLC chat log 222 of messages being sent and received by the CDA 130. Additionally, the flight crew may opt to monitor CPDLC messages sent and received by the NDA 140.

In one embodiment of the inventive concepts disclosed herein, the system for CPDLC chat 200 may exist separately from (and may not replace) the traditional onboard CPDLC system 250 on the ownship aircraft 110. This traditional CPDLC system 250 may be functional to receive and respond to uplink messages and transmit downlink messages. Such traditional CPDLC system 250 may include the controller 230 with an associated memory 232, the radio 234, the antenna 236, and a CPDLC display/pilot interface 210 offering pilot input commands as well as displaying ownship data 240. In embodiments, the radio may be associated with one or more systems onboard the aircraft 110 or function as a dedicated CPDLC radio.

In another exemplary embodiment, the system for CPDLC chat 200 may replace a currently installed traditional CPDLC system 250. In this manner, the flight crew may interact with the system for CPDLC chat 200 using similar methods as with a traditional CPDLC system 250.

The system for CPDLC chat 200 may receive from the flight crew each outbound CPDLC message as well as inbound messages addressed to the ownship aircraft 110 and aircraft 112 114 and CDA 130 NDA 140 the ownship pilots may wish to monitor.

In one embodiment of the inventive concepts disclosed herein, the system for CPDLC chat 200 may not only display message data from other aircraft 112 114 and the CDA 130 and NDA 140, but also receive messages transmitted and received by the ownship aircraft 110. The system for CPDLC chat 200 may highlight (e.g., color, bold font, backlight etc.) these messages in the CPDLC chat log 222. In this manner, the pilot of the ownship aircraft 110 may easily recognize CPDLC messages addressed to the ownship aircraft 110 and intended for immediate action.

In one embodiment, an inbound message addressed to and received by the ownship aircraft 110 may be a first inbound type of CPDLC data message. A message sent by the CDA 130 NDA 140 and addressed to a second aircraft 112, 114 and received by the radio 234 may be considered a second inbound type of message. While a third inbound type of CPDLC message may be considered a message originated at the second aircraft 112, 114 sent to the CDA 130 NDA 140 but also received by the radio 234. An outbound message may be considered as being one that is originated by the pilots onboard the ownship aircraft 110.

In one embodiment of the inventive concepts disclosed herein, display of each of the first, second, and third CPDLC inbound and the outbound data messages on the pilot display may include a display of an associated time stamp, a name of the sender, a name of the receiver, and a text of the message body.

The CPDLC chat log 222 may offer enhanced pilot awareness to each pilot using the system for CPDLC chat 200. For example, the system for CPDLC chat 200 may display on the MFD 220 the pilot selectable set of data from which the pilot of the ownship aircraft 110 (here, RC007) may display. As each nearby aircraft 112 114 communicates with ATC (here, Chicago Air Route Traffic Control Center (ARTCC)), the system for CPDLC chat 200 displays the CPDLC chat log 222 to the ownship aircraft 110 pilots on the MFD 220. Here, the pilots of RC007 may learn that AA524 is deviating for weather and DL32 is climbing to FL370. Prior to implementation of the inventive concepts disclosed herein, the pilots of RC007 would be oblivious to this information.

In one embodiment of the inventive concepts disclosed herein, the system for CPDLC chat 200 may receive a CPDLC inbound data message from the radio 234 and send the CPDLC inbound data message to a CPDLC display/pilot interface 210, the CPDLC inbound data message addressed to the first aircraft 110. Here, the controller 230 may be configured to receive a CPDLC outbound data message from the CPDLC display/pilot interface 210 and send the CPDLC outbound data message to the radio 230, the CPDLC outbound data message addressed to a data authority (e.g., the CDA or the NDA).

The associated memory 232 may comprise a tangible, non-transitory memory configured to communicate with the controller, the tangible, non-transitory memory having instructions stored therein that, in response to execution by the controller, cause the controller to preform function associated with the system for CPDLC chat 200. Specifically, the system for CPDLC chat may receive a CPDLC inbound data message addressed to a second aircraft. Here, the second aircraft may be a nearby aircraft such as the parallel aircraft 114 as well as the opposite aircraft 112. The system for CPDLC chat may display the received CPDLC inbound data message addressed to the second aircraft on the pilot display. Here, the pilot display may include a MFD, heads up display (HUD) and additional displays designed for pilot viewing.

The system for CPDLC chat may also receive a CPDLC inbound data message sent from the second aircraft 112 114 and addressed to the data authority 130 140 and display the received CPDLC inbound data message addressed to the data authority on the pilot display. In this manner, the system for CPDLC chat 200 may function as a source of all CPDLC data messages selected by the pilots of the ownship aircraft 110 for display in the ownship aircraft 110 flight deck display MFD 220.

In one embodiment of the inventive concepts disclosed herein, the MFD 220 may comprise an installed display onboard the aircraft as well as a hand-held tablet device configured to display the CPDLC chat log 222. It is contemplated herein, the hand-held tablet device may receive wireless data from the ownship aircraft 110 traditional CPDLC system via an onboard wireless network as well as via an individual tablet radio connection with the CDA 130.

Further, system for CPDLC chat 200 may display an aggregate of messages between ATC and all aircraft may be available from data service providers, such as ARINC. Contemplated herein, the system for CPDLC chat 200 may receive and display all messages to and from the CDA 130 and the NDA 140, as well as any data authority the pilot may select. In one embodiment of the inventive concepts disclosed herein, the system for CPDLC chat 200 may function to receive and display CPDLC data messages sent from each data authority CDA 130 NDA 140 selected by the pilot. In this manner, the CDA 130 may function as a broadcast center for each CPDLC data message it may send and receive and broadcast (repeat) each transmission to all participating aircraft limited by pilot selection.

These messages may be streamed to the aircraft via line of sight radio frequency data streams as well as satellite communication data streams. As the industry moves towards "connectionless" CPDLC where an aircraft may not be required to explicitly connect or login with a CDA to exchange information, the system for CPDLC chat 200 may function to receive and display each message to the flight crew. Also, should an industry migrate toward an Internet Protocols Suite (IPS) based network technology, system for CPDLC chat 200 is configured to receive and display CPDLC messages between various ground stations and aircraft. The system for CPDLC chat 200 will allow each pilot to determine a set of aircraft and CDA 130 NDA 140 to which the system for CPDLC chat 200 may listen.

For example, on a transatlantic ocean track, pilots of an ownship aircraft 110 may employ the system for CPDLC chat 200 to monitor communications between each aircraft on their assigned track regardless of the range at which each aircraft is distant from the ownship aircraft 110 or direction of flight. In this manner, the pilots of the ownship aircraft 110 may gain situational awareness about conditions 100, 300 or 500 or greater miles down track from a current position.

As the system for CPDLC chat 200 is a situational-awareness tool, it may be configured to be displayed as a Multi-Function Format on an avionic display or on a tablet/Electronic Flight Bag (EFB) application, such as "ARINC Direct." In addition, the CPDLC log 222 may be displayed on any flight deck display system that incorporates CPDLC, in addition to an Information Management Services (IMS) ARINC Direct tablet application.

FIG. 3

Figure 3:
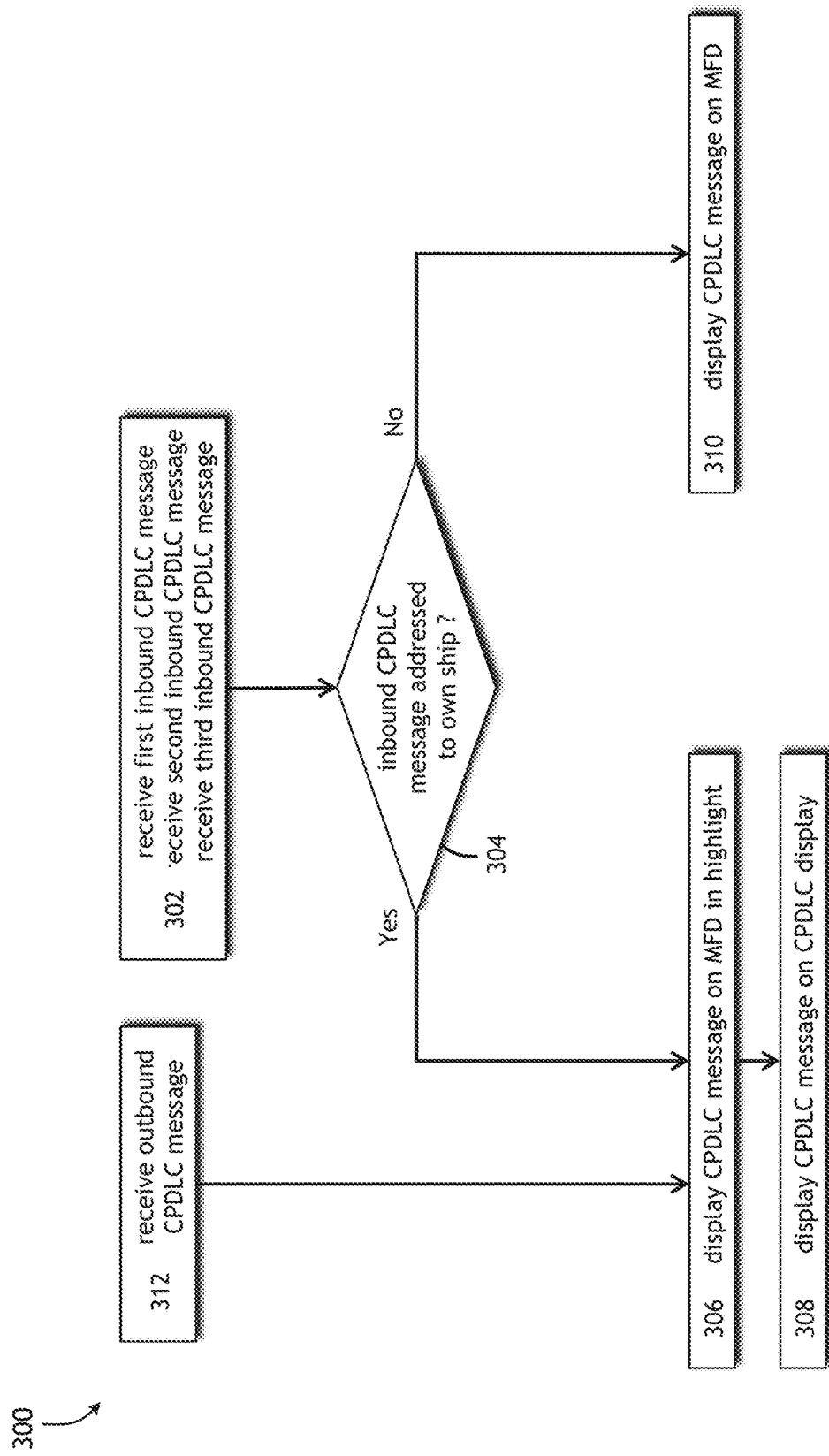
FIG. 3 is a diagram of a flowchart for CPDLC chat exemplary of an embodiment of the inventive concepts disclosed herein.

Referring now to FIG. 3, a diagram of a flowchart for CPDLC chat exemplary of an embodiment of the inventive concepts disclosed herein is shown. A logic flow 300 of the system for CPDLC chat 200 may include receiving a first, second and third inbound CPDLC message at a step 302. In review, the message types here may include:

Outbound—Originated by ownship 110;
First Inbound—Originated by CDA 130 and addressed to ownship 110;
Second Inbound—Originated by CDA 130 and addressed to other aircraft 112 114; and
Third Inbound—Originated by other aircraft 112 114 and addressed to any data authority CDA 130 NDA 140.

Each type of inbound CPDLC message may be addressed to any entity within an area selected by the pilot (e.g., parallel aircraft 114, CDA 130, NDA 140, all entities within a specific range). At a step 304, the logic may query if the inbound CPDLC message is associated (e.g., a first type of inbound) the ownship aircraft 110. If the result is negative, the logic may flow to a step 310 with displaying the CPDLC message on the MFD 220.

Should the result of query 304 be positive, the logic may flow to a step 306 with display of the CPDLC message on MFD in highlight to ensure the pilots of the ownship 110 may discriminate the ownship messages from the list within the CPDLC chat log 222. At a step 308 the logic may further display the inbound ownship message on a CPDLC display 210.

FIG. 4

Figure 4:
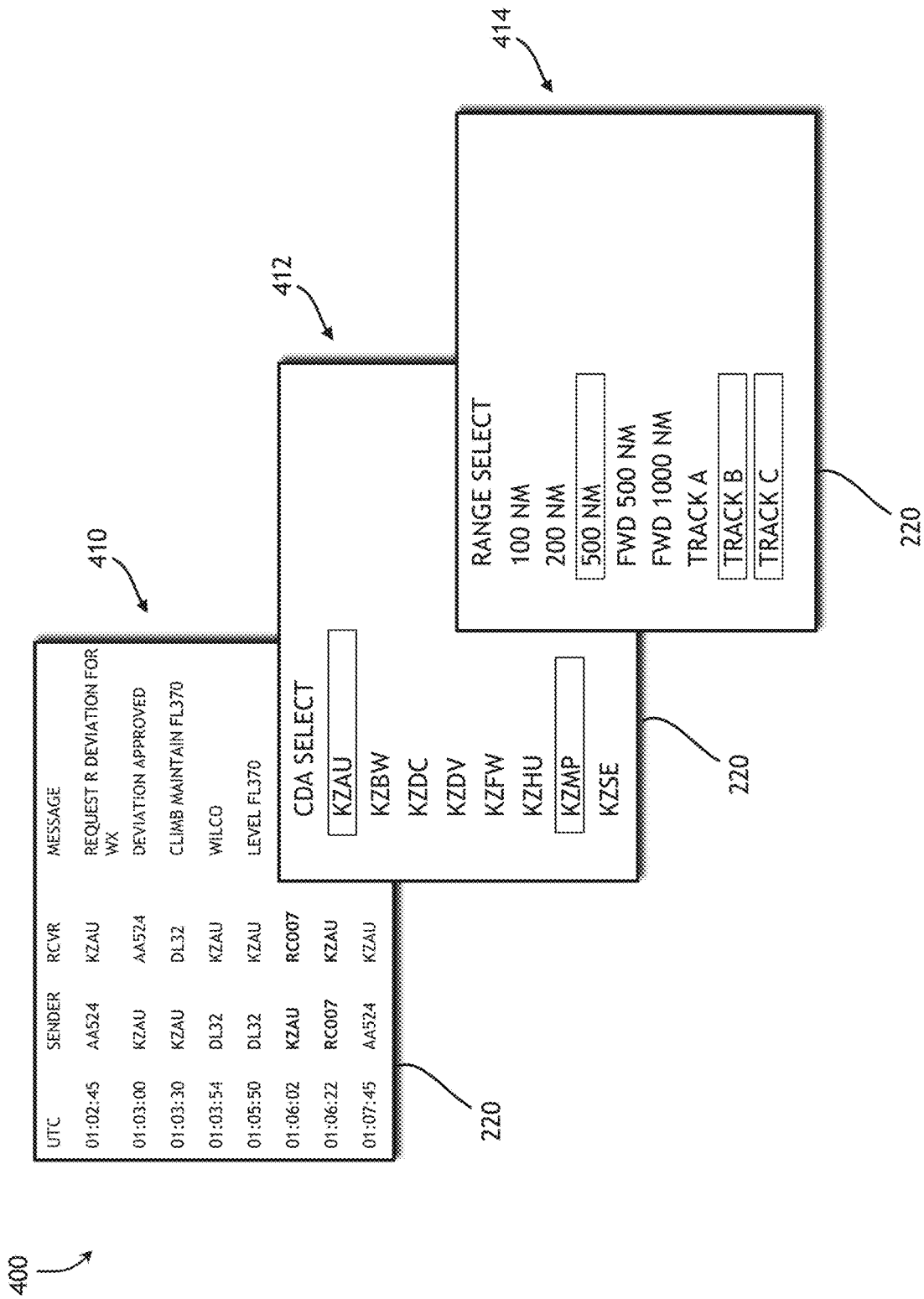
FIG. 4 is a diagram of available settings for a method for CPDLC chat exemplary of one embodiment of the inventive concepts disclosed herein.

Referring now to FIG. 4, a diagram of available settings for a method for CPDLC chat exemplary of one embodiment of the inventive concepts disclosed herein is shown. Available settings 400 may be optionally selectable by the flight crew to ensure desired entities are monitored for maximum situational awareness.

Contemplated herein, the MFD 220 (and additional display types) may include capability for pilot interaction via a touch screen user interface capable of selection of various settings associated with the system for CPDLC chat 200. For example, a log page 410 may include the CPDLC chat log 222 while a CDA page 412 may include a list of CDA from which the pilot may select to monitor. Also, a range page 414 may include a selectable geographical range AND Track from which the pilot may monitor communication (e.g., 100 MN, 200 NM, 500 NM, TRACK A) range of monitoring.

The system for CPDLC chat 200 may offer a display filtered by a pilot selectable limitation in range, track, aircraft type, and altitude. Also, a limitation in messages forward of the ownship aircraft 110 since the ownship aircraft 110 is tracking in a forward direction. Messages forward of the ownship aircraft 110 and beyond line of sight may be of particular interest to the ownship aircraft 110 pilots.

FIG. 5

Figure 5:
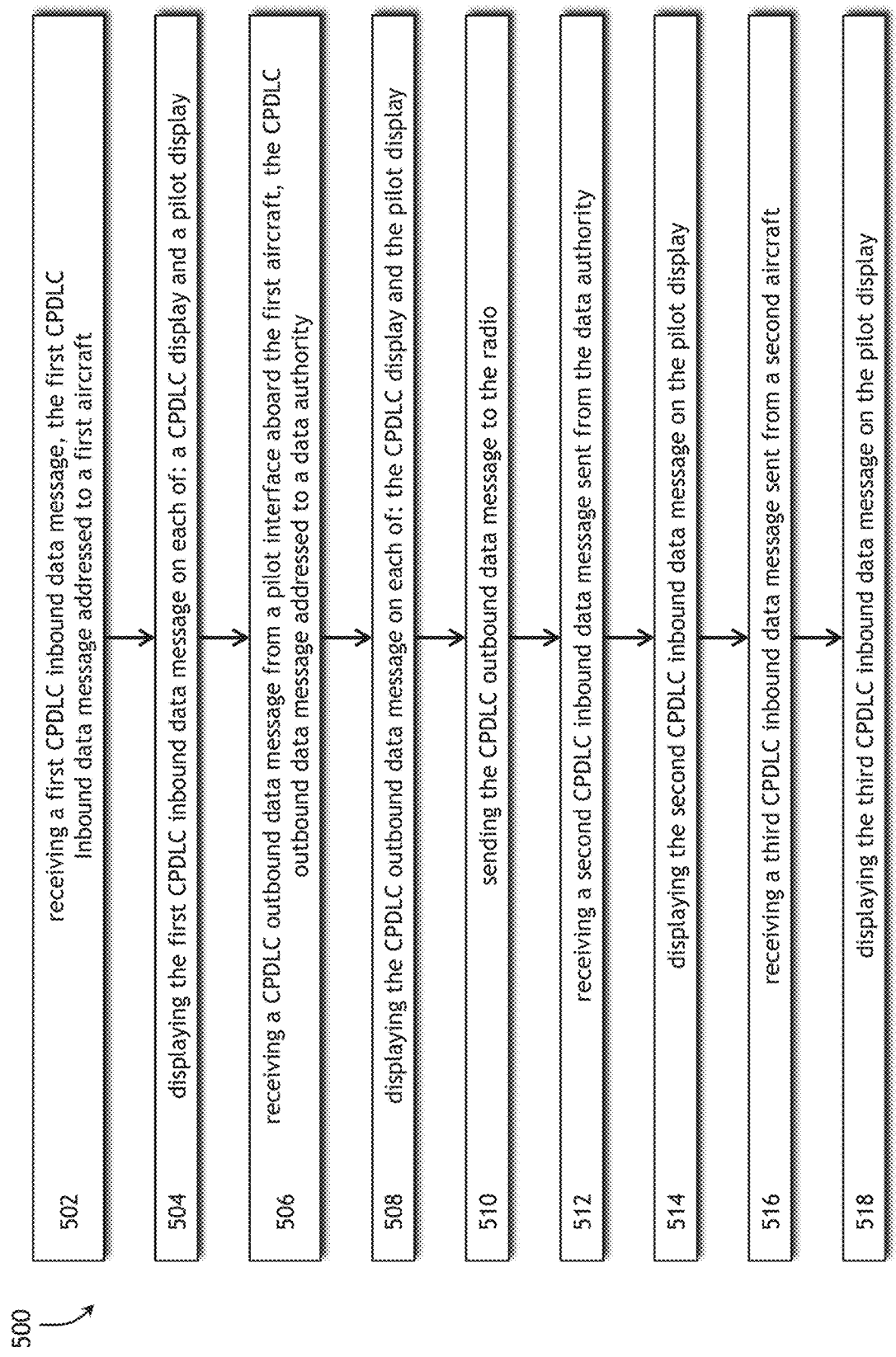
FIG. 5 is a diagram of a method for CPDLC chat in accordance with one embodiment of the inventive concepts disclosed herein.

Referring now to FIG. 5, a diagram of a method for CPDLC chat in accordance with one embodiment of the inventive concepts disclosed herein is shown. A method flow 500 for CPDLC chat may include, at a step 502, receiving a first CPDLC inbound data message, the first CPDLC inbound data message addressed to a first aircraft. A step 504 may include displaying the first CPDLC inbound data message on each of: a CPDLC display and a pilot display. A step 506 may include receiving a CPDLC outbound data message from a pilot interface aboard the first aircraft, the CPDLC outbound data message addressed to a data authority and a step 508 may include displaying the CPDLC outbound data message on each of: the CPDLC display and the pilot display. To transmit the message, a step 510 may include sending the CPDLC outbound data message to the radio.

To display messages from additional entities, a step 512 may include receiving a second CPDLC inbound data message sent from the data authority while a step 514 may include displaying the second CPDLC inbound data message on the pilot display. A step 516 may receive a third CPDLC inbound data message sent from a second aircraft and a step 518 may include displaying the third CPDLC inbound data message on the pilot display.

CONCLUSION

As will be appreciated from the above description, embodiments of the inventive concepts disclosed herein may provide an ability for increasing mutual support between aircraft building pilot situational awareness via a display of communications between nearby aircraft and a controlling authority.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for mutual display of Controller Pilot Data Link Communication (CPDLC) messages, comprising:
   a radio configured for sending and receiving radio frequency data signals;
   an antenna operatively coupled with the radio;
   the radio and the antenna functional on a first aircraft;
   a controller operatively coupled with the radio, a CPDLC display, and a pilot display, wherein the CPDLC display is a separate display than the pilot display;
   a tangible, non-transitory memory configured to communicate with the controller, the tangible, non-transitory memory having instructions stored therein that, in response to execution by the controller, cause the controller to:
   receive a first CPDLC inbound data message, the first CPDLC inbound data message addressed to the first aircraft;
   display the first CPDLC inbound data message on each of: the CPDLC display and the pilot display;
   receive a CPDLC outbound data message from a pilot interface aboard the first aircraft, the CPDLC outbound data message addressed to a data authority;
   display the CPDLC outbound data message on each of: the CPDLC display and the pilot display;
   send the CPDLC outbound data message to the radio;
   receive a second CPDLC inbound data message sent from the data authority but not addressed to the first aircraft;
   display the second CPDLC inbound data message on the pilot display, wherein the second CPDLC inbound data message is not displayed on the CPDLC display;
   receive a third CPDLC inbound data message sent from a second aircraft but not addressed to the first aircraft; and
   display the third CPDLC inbound data message on the pilot display, wherein the third CPDLC inbound data message is not displayed on the CPDLC display, wherein display of each of the first, second, and third CPDLC inbound and the outbound data messages on the pilot display further comprises a display of a time stamp, a sender, a receiver, and a message body, and wherein display of the first CPDLC inbound data message and display of the CPDLC outbound data message on the pilot display further comprises a highlighted display comprising one of an alternate color, an alternate font, and an alternate backlight associated with the first CPDLC inbound message.

2. The system for mutual display of Controller Pilot Data Link Communication (CPDLC) messages of claim 1, wherein the data authority further comprises one of a current data authority and a next data authority.

3. The system for mutual display of Controller Pilot Data Link Communication (CPDLC) messages of claim 1, wherein the radio configured for sending and receiving radio frequency data signals further comprises a dedicated CPDLC radio.

4. The system for mutual display of Controller Pilot Data Link Communication (CPDLC) messages of claim 1, wherein receive a second CPDLC inbound data message sent from the data authority further comprises reception of all messages to and from the data authority.

5. The system for mutual display of Controller Pilot Data Link Communication (CPDLC) messages of claim 4, wherein receive a second CPDLC inbound data message sent from the data authority further comprises reception of an Internet Protocols Suite (IPS) based message.

6. The system for mutual display of Controller Pilot Data Link Communication (CPDLC) messages of claim 1, wherein display the second and third CPDLC inbound data message on the pilot display further comprises a display filtered by a pilot selectable limitation in aircraft type.

7. The system for mutual display of Controller Pilot Data Link Communication (CPDLC) messages of claim 1, wherein the pilot display further comprises a hand-held tablet device in data communication with one of: the controller and the data authority.

8. The system for mutual display of Controller Pilot Data Link Communication (CPDLC) messages of claim 1, wherein the radio configured for sending and receiving radio frequency data signals further comprises a radio configured for satellite communications.

9. A method for CPDLC chat, comprising:
   receiving a first CPDLC inbound data message, the first CPDLC inbound data message addressed to a first aircraft;

displaying the first CPDLC inbound data message on each of: a CPDLC display and a pilot display, wherein the CPDLC display is a separate display than the pilot display;

receiving a CPDLC outbound data message from a pilot interface aboard the first aircraft, the CPDLC outbound data message addressed to a data authority;

displaying the CPDLC outbound data message on each of: the CPDLC display and the pilot display;

sending the CPDLC outbound data message to the radio;

receiving a second CPDLC inbound data message sent from the data authority but not addressed to the first aircraft;

displaying the second CPDLC inbound data message on the pilot display, wherein the second CPDLC inbound data message is not displayed on the CPDLC display;

receiving a third CPDLC inbound data message sent from a second aircraft but not addressed to the first aircraft; and displaying the third CPDLC inbound data message on the pilot display, wherein the third CPDLC inbound data message is not displayed on the CPDLC display, wherein displaying of each of the first, second, and third CPDLC inbound and the outbound data messages on the pilot display further comprises a display of a time stamp, a sender, a receiver, and a message body, and wherein displaying of the first CPDLC inbound data message and displaying of the CPDLC outbound data message on the pilot display further comprises a highlighted display comprising one of an alternate color, an alternate font, and an alternate backlight associated with the first CPDLC inbound message.

10. The method for CPDLC chat of claim 9, wherein the data authority further comprises one of a current data authority and a next data authority.

11. The method for CPDLC chat of claim 9, wherein the radio configured for sending and receiving radio frequency data signals further comprises a dedicated CPDLC radio.

12. The method for CPDLC chat of claim 9, wherein receiving a second CPDLC inbound data message sent from the data authority further comprises reception of all messages to and from the data authority.

13. The method for CPDLC chat of claim 9, wherein displaying the second and third CPDLC inbound data message on the pilot display further comprises a display filtered by a pilot selectable limitation in aircraft type.

14. The method for CPDLC chat of claim 9, wherein receive a second CPDLC inbound data message sent from the data authority further comprises reception of an Internet Protocols Suite (IPS) based message.

15. The method for CPDLC chat of claim 9, wherein the pilot display further comprises a hand-held tablet device in data communication with one of: the controller and the data authority.

16. The method for CPDLC chat of claim 9, wherein the radio configured for sending and receiving radio frequency data signals further comprises a radio configured for satellite communications.

* * * * *